May 30, 1967 H. WINTER 3,322,900

PRETRANSLATION CIRCUIT FOR MULTIFREQUENCY TO DIAL PULSE CONVERTER

Filed March 25, 1964 4 Sheets-Sheet 1

INVENTOR
H. WINTER
BY Howard R. Popper
ATTORNEY

May 30, 1967 H. WINTER 3,322,900

PRETRANSLATION CIRCUIT FOR MULTIFREQUENCY TO DIAL PULSE CONVERTER

Filed March 25, 1964 4 Sheets-Sheet 2

May 30, 1967 H. WINTER 3,322,900

PRETRANSLATION CIRCUIT FOR MULTIFREQUENCY TO DIAL PULSE CONVERTER

Filed March 25, 1964 4 Sheets-Sheet 3

United States Patent Office 3,322,900

Patented May 30, 1967

3,322,900

PRETRANSLATION CIRCUIT FOR MULTIFREQUENCY TO DIAL PULSE CONVERTER

Harry Winter, New Brunswick, N.J., assignor to Bell Telephone Laboratories, Incorporated, New York, N.Y., a corporation of New York Filed Mar. 25, 1964, Ser. No. 354,618
14 Claims. (Cl. 179—18)

This invention relates to switching equipment and more particularly to a pretranslation circuit complementing pulse conversion.

In certain switching applications, an environment exists wherein many inputs deliver to common equipment a plurality of signals each of which may consist of some sort of representative numerical series. For example, in certain telephone switching systems, arrangements known as senders, registers and converters are quite common and very often all of these circuit blocks must be utilized to set up connections through the system. In order for such a system to operate efficiently, it is required that such common equipment be made rapidly accessible to and be held for only a short time by any of the plurality of individual inputs. Based on such a common equipment approach, it follows that the faster such equipment is disconnected from an input after a particular signal processing or switching sequence, the fewer such circuit blocks will be required.

To continue the illustration with reference to a telephone system, input information thereto might be the telephone directory number of a called party, received by the system as a series of incoming digits in the form of dial pulses. Such incoming digits may occur in many different sequences, and different groups of the sequences may in turn require quite different treatment by the responsive switching equipment. Certain initial digits may indicate a direct distance dial (DDD) call having a prescribed complement of digits to follow. A typical DDD call, for example, commences wiht a three-digit "area code," the middle digit of which must be a 0 or a 1. "Special service" calls to an operator or to the business office, etc. are other examples. Suffice to say that it is clear that calls may be of varying digital length or duration, but that the common equipment is almost invariably called in, whether there be 1 or 13 digits in a particular sequence.

In poviding for some arrangement to disconnect common equipment from service requesting equipment such as customers' lines, certain prior art circuitry has relied on a "time-out" feature to provide the disconnect signal. That is, since the maximum number of digits acceptable by the system in any one particular sequence was known, the circuit was arranged to automatically disconnect the common equipment after a time period corresponding to the transmission of that maximum number of digits had elapsed. While such systems were workable, they were not particularly economical in that they maintained certain switching connections long after the final digit was transmitted. Thus, where the time-out feature was arranged for a maximum of 13 digits but only three digits were actually sent in a particular sequence, a requirement for more common equipment as well as for an increased burden on existing equipment resulted.

The concept of "pretranslation" was developed in part to alleviate such problems. A typical pretranslator is shown in R. C. Avery Patent 2,680,781, issued June 8, 1954, this circuit being usable with a crossbar telephone system such as that disclosed in A. J. Busch Patent 2,585,904, issued Feb. 19, 1952. In a system such as that typified by Busch and Avery, common switching equipment such as an originating register seizes a pretranslation circuit at the commencement of a telephone service request. An initial group of the transmitted digits is then sent to the pretranslator for a determination of the presence of any coded significance in the digits. For example, the first three digits might be transmitted to the pretranslator which determines, inter alia, the total number of digits to be expected; if the sequence of these first three digits indicates a 7-digit call, the originating register is informed to seize a marker circuit immediately following receipt of the seventh digit. Meanwhile the pretranslator may be released and will consequently be available for use by other originating registers. Macurdy et al. application Ser. No. 79,885, filed Dec. 30, 1960, now Patent No. 3,127,479, is another example of prior art pretranslator circuitry.

These circuits represent an improvement over the time-out arrangement but are not very efficient in applications where relatively few digits are usually received and where equipment size is an important factor. An example of such a system could be a private branch exchange (PBX) where from one to four digits are usually required to establish connections among stations and between stations and tie lines or an operator position.

It is therefore a general object of this invention to improve pretranslation circuitry.

Another object of this invention is to provide flexible pretranslation in a switching system to make common connecting equipment more rapidly available to incoming communicating paths.

An additional object of this invention is to furnish a pretranslator operative on inputs of varying duration and digital content, such pretranslation being independent of both the number and time duration of the incoming digits.

Still another object of this invention is to provide a pretranslator constituted of a relatively simple solid state memory which may be sequentially scanned to provide a readout signal indicative of the total number of digits anticipated in a particular sequence.

In one illustrative embodiment of the present invention, the pretranslator is coupled for use with a multifrequency-to-dial pulse converter, which may be of a known type. The converter is utilized to permit common equipment which is pulse responsive to operate with multifrequency signaling or "pushbutton" equipment. The converter is advantageously synchronously controlled by a pulse power supply and includes input drive and memory circuits for registering each multifrequency digit that is received in a form amenable to subsequent translation into dial pulses. As each digit so registered is converted to its corresponding sequence of dial pulses suitable for use by the pulse responsive common equipment, an "end-of-digit" signal is generated.

The pretranslator which is connected to the converter includes an input logic circuit, a memory unit, an output counter and a disconnect circuit, the latter serving to disconnect a particular converter from a calling line at the appropriate time. At the same time that the received digit is being stored in the converter memory, an indication of that digit is provided to the pretranslator logic circuit by the converter input drive circuit, the logic circuit being controlled by selected stages of the converter write circuit. Based on a predetermined code for the PBX involved, the transmission of the first or of the first and second digits indicates the total number of digits to be expected. The logic circuit is prewired in accordance with this code to provide input signals to the pretranslator memory. Each cell of the memory has digital significance with respect to the total number of digits to be transmitted in a given sequence; that is, storage of a bit in a particular cell indicates a two-digit call while storage of a bit in another cell indicates a three-digit call. Thus, the pre- ınslator logic may receive, for example, a signal in two-t-of-seven code from the converter circuit representative a particular digit which signifies, for example (in ac-rdance with the predetermined PBX code), a two-digit ll. As the digit is being transmitted through the con-rter so as to present it in suitable form to pulse respon-re equipment, it has also been stored in the appropriate econd) cell of the pretranslator memory.

When the first digit has passed through the converter, e first end-of-digit signal is generated and the output unter of the pretranslator is energized to read out any formation which may have previously been stored in e first cell of the pretranslator memory. Continuing the pothetical assumption of a two-digit call, no signal is ad out from the pretranslator memory when the output unter scans the memory's first stage (since this is the st end-of-digit signal and since only the first memory ll is scanned). When the second digit has passed through e converter, a second end-of-digit signal is generated hich causes the counter to scan the second memory cell. nce a two-digit call has been assumed, the second mem-y cell will provide an affirmative readout to the discon-ct circuit which disconnects the converter from the lling line.

In addition to the above-described functions of the pre-anslator memory which operates to register a single git indicating the length of the digit sequence anticipated, e pretranslator memory is also arranged to register a ombination of digits where such a combination of digits dicates the length of the digit sequence anticipated. It an aspect of this operation of the pretranslator circuit f my invention that the memory stages storing this com-nation of digits are simultaneously interrogated upon e detection of a predetermined end-of-digit signal. How-ver, readout is inhibited at this time by the detection of e inception of switching in one of these stages. On the ceipt of a subsequent end-of-digit signal, an interroga-on signal is directed solely to the memory stage that was riorly inhibited from switching to obtain therefrom an ffirmative readout indicating the end of the digit se-uence.

A feature of the present invention is a pretranslator hich samples digits being furnished to a main translator, electively decodes the digits to determine whether the igits are indicative of the total number of digits to be urnished the main translator, and which stores the indi-ation so obtained at least until the main translator has ompleted the translation of the digits so furnished.

It is another feature of this invention that a digit being urnished to a converter as part of a sequence of digits e selectively stored in a particular portion of a pre-ranslator memory to indicate the total number of digits nticipated.

It is another feature of the present invention that a ounter circuit respond to the number of digits already ranslated by the converter to selectively interrogate a ifferent one of the portions of the pretranslator memory.

It is still another feature of the present invention to tore a digit in the pretranslator memory so that it can e read out only upon an interrogation following the ranslation of some digit subsequent to the digit stored.

A further feature of the present invention is a pretrans-ator having a plurality of memory stages including nemory stages for storing digits individually indicating he length of a digit sequence, memory stages for storing ligits individually conditionally indicating the length of digit sequence, and means for selectively interrogating he memory stages after each digit is translated.

A still further feature of the present invention is means o selectively render one stage of a combination of pre-ranlsator memory stages effective to indicate the length of a digit sequence by interrogating the combination of tages following one end-of-digit signal, inhibiting read-out by the detection of switching in another stage of the combination and re-interrogating the one stage of the combination following a subsequent end-of-digit signal to obtain a readout signal indicating the end of the digit sequence.

These and other objects and features of this invention may be gathered from a consideration of the following description when read with the drawing in which.

GENERAL DESCRIPTION

Figures 1, 1A:
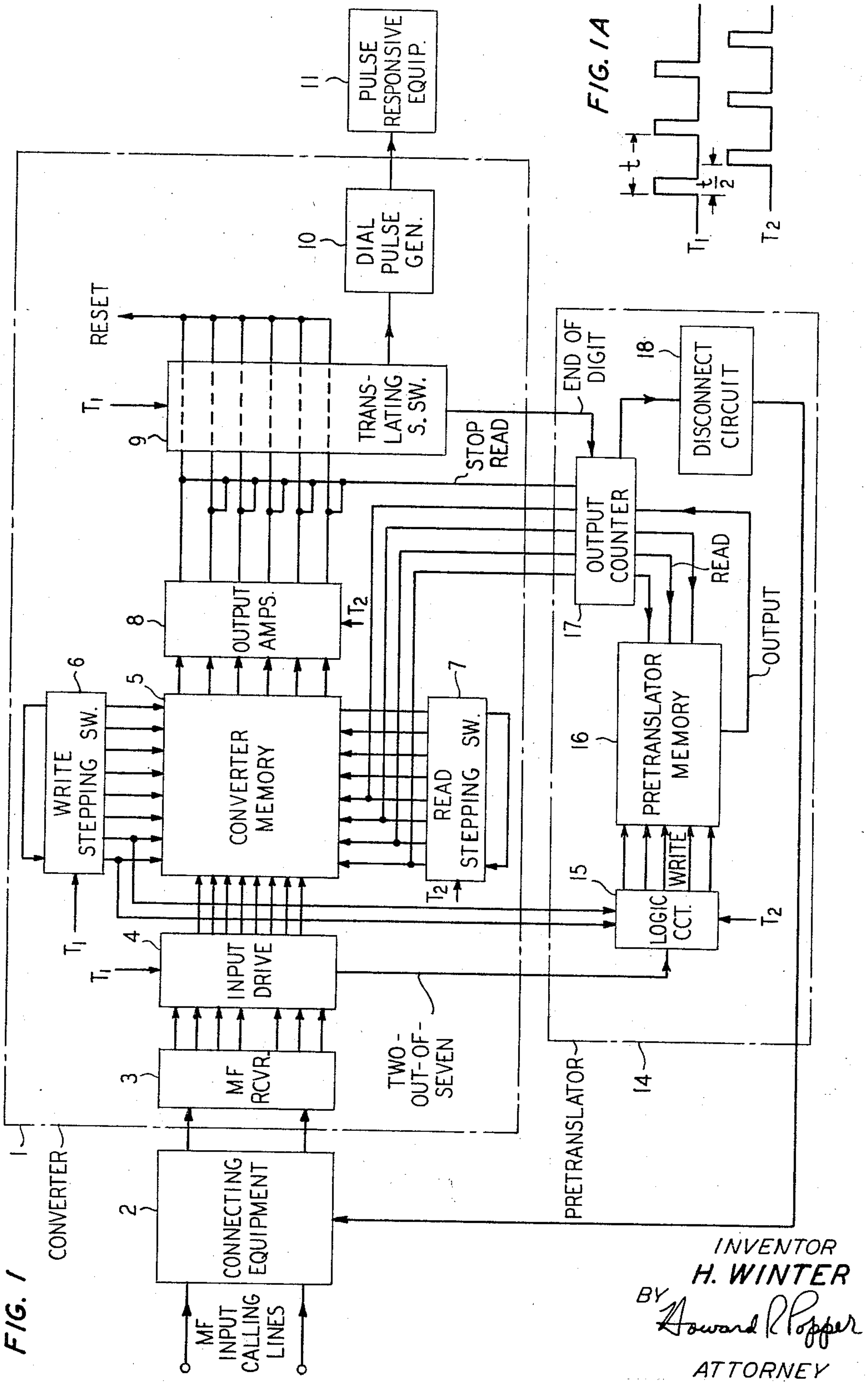
FIG. 1 is a block diagram showing the relationship between the converter and the pretranslator.
FIG. 1A shows a pulse schedule which may synchronously control the overall system.

*Block diagram—FIG. 1*

For the purpose of this description, it will be assumed that the converter and pretranslator to be discussed are being used in a PBX, although they are clearly not limited to such an application. The PBX may similarly be assumed to have distributed extension numbers based on a predetermined coding arrangement as has been adverted to supra and which will be discussed in greater detail in connection with FIGS. 2 through 5.

Shown in FIG. 1 are a multifrequency-to-dial pulse converter 1 which is connectable to a plurality of calling lines or stations through any of a variety of well-known switching devices included in the block numbered 2. The converter which may be of the general type disclosed in L. A. Hohmann, Jr., Patent 2,933,563, issued Apr. 19, 1960, includes a multifrequency receiver 3, an input drive circuit 4, a memory 5, a write stepping switch 6, a read stepping switch 7, an output amplifier circuit 8, a translating stepping switch 9 and a dial pulse generator 10 which connects the converter to pulse responsive equipment 11 which may be located either at the PBX or in the associated central office. The converter (as well as the pretranslator) is synchronously controlled by a pulse power supply (not shown) the pulse schedule of which is indicated in FIG. 1A; this schedule consists of alternately phased pulses $T_1$ and $T_2$. These pulses energize the write and read stepping switches 6 and 7, the output amplifiers 8 and the translating stepping switch 9 in the converter. The translating stepping switch 9 which generates the end-of-digit signal to cause the pretranslator output counter 17 to scan the pretranslator memory 16 may be of the general type disclosed in N. Botsford, Jr., application Ser. No. 333,149, filed Dec. 24, 1963.

When the converter 1 has been connected to any of a plurality of calling lines by the connecting equipment 2, the push-button multifrequency signals representative of a "dialed" digit from the calling line are received through the connecting equipment 2 by the multifrequency receiver 3. The receiver, which may be of the type disclosed in C. G. Morrison et al. Patent 3,143,602, issued Aug. 4, 1964, converts the two-out-of-seven voice frequency signals into corresponding two-out-of-seven D.-C. signals which are then transmitted to the input drive circuit 4. On the following $T_1$ control pulse, the input drive circuit 4 and the write stepping switch 6 are both energized to cause a particular digit to be stored in the converter memory 5. When the following $T_2$ control pulse occurs, the read stepping switch 7 is energized to sequentially read out any information which may have previously been stored in the converter memory 5. Assuming a valid write-in and readout cycle, the output information is amplified by the output amplifier circuit 8, an output on any lead of which produces a "stop read" signal transmitted to the pretranslator output counter 17 and to the translating stepping switch 9 of the converter.

The translating stepping switch 9 is arranged to receive the amplified digital information in parallel form and to read it out in serial form to a dial pulse generator 10 which may for example be a modified flip-flop circuit. The narrow width (e.g., one microsecond) signals to the generator 10 are in effect "stretched" and proceed to the pulse responsive equipment 11 as dial pulses of the usual duration and spacing. It may also be noted that the translating stepping switch 9 generates an end-of-digit signal subsequent to the final pulse of a particular digital sequence; thus, if it is assumed that the digit 5 has been transmitted through the converter, the translating stepping switch 9 will generate the end-of-digit signal after it has outpulsed a sequence of five narrow width pulses to the dial pulse generator 10.

The pretranslator circuit 14, in accordance with my invention, is comprised of a logic circuit 15 the input of which is controlled both by the converter input drive circuit 4 and the first two stages of the write stepping switch 6 of the converter circuit; information is transmitted from the logic circuit 15 to the pretranslator memory 16 under the control of $T_2$ pulses. Storage is achieved in the pretranslator memory prior to the completion of the transmission of a digit sequence through the coupled converter circuit and therefore prior to the generation of the end-of-digit signal by the translating stepping switch 9. When, however, such an end-of-digit signal is generated, it energizes the pretranslator output counter 17 which then reads or scans particular cells of the memory 16. For example, following the first end-of-digit signal, the output counter scans the first cell of the memory 16, and following the second end-of-digit signal (should there be one in a particular sequence) the counter 17 scans the second cell of the memory 16, etc. If, in accordance with the predetermined PBX code, the logic circuit 15 has caused a bit to be stored in the first cell of the pretranslator memory 16 thereby indicating a one-digit call, this will be revealed when the output counter 17 scans the first cell of the memory 16 immediately following the first end-of-digit signal. Readout will then occur and the disconnect circuit 18 will be energized to cause the connecting equipment 2 to release the converter 1 from the particular calling line involved. If, on the other hand, the coded digit has been transmitted through the logic circuit 15 to a higher order cell of the memory 16, such as the third cell, scanning by the output counter 17 of the first and second cells following the first and second end-of-digit signals, respectively, will result in no readout to the disconnect circuit 18; only when the output counter 17 scans the third cell of the memory 16 will the disconnect circuit 18 be notified that the particular calling line has completed its complement of digits and the converter may thus be released.

DETAILED DESCRIPTION

Figure 2:
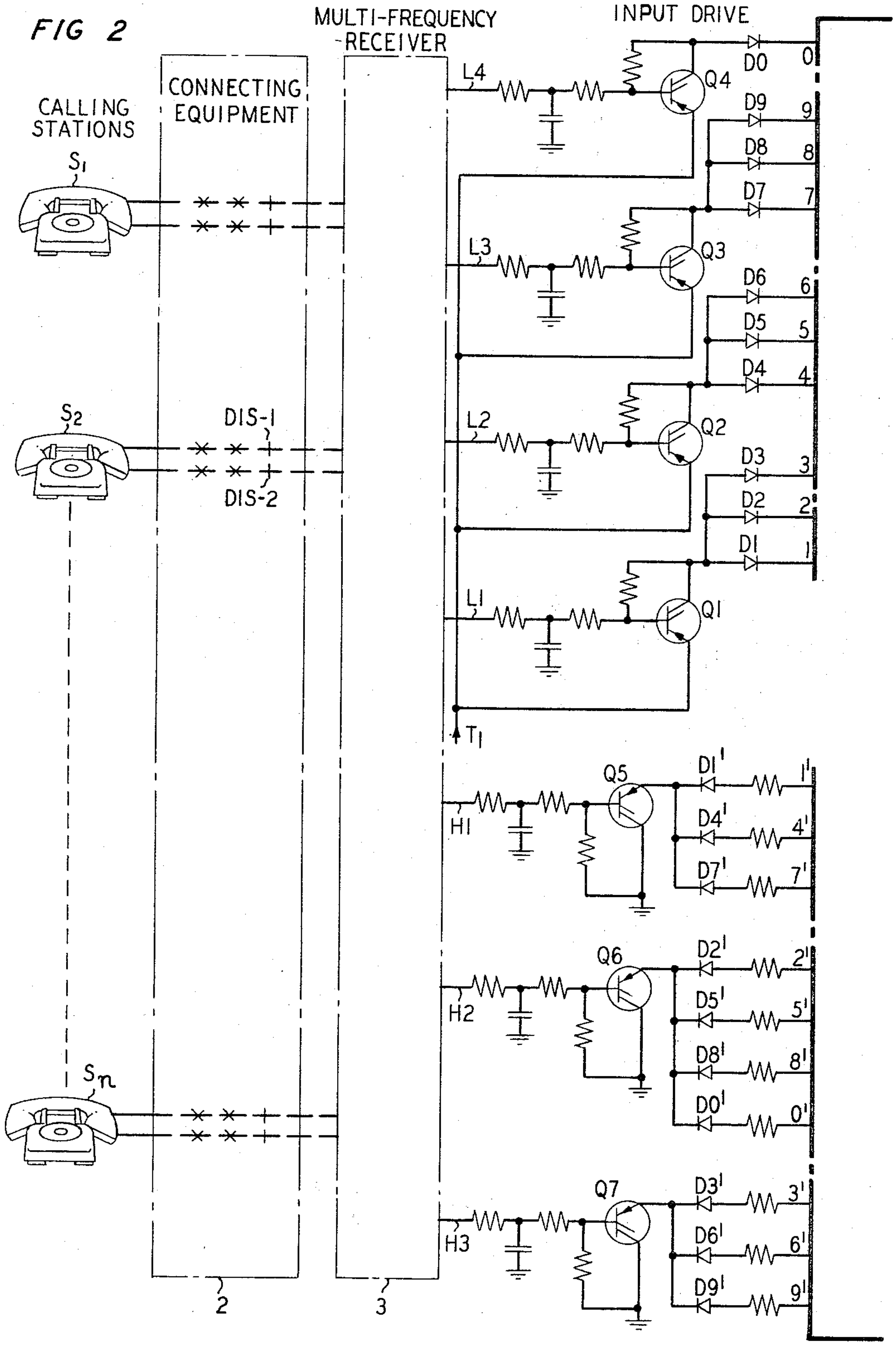
FIG. 2 shows selected calling stations connectable, through switching equipment and a multifrequency receiver shown in block form, to a portion of an input drive circuit.
Figure 3:
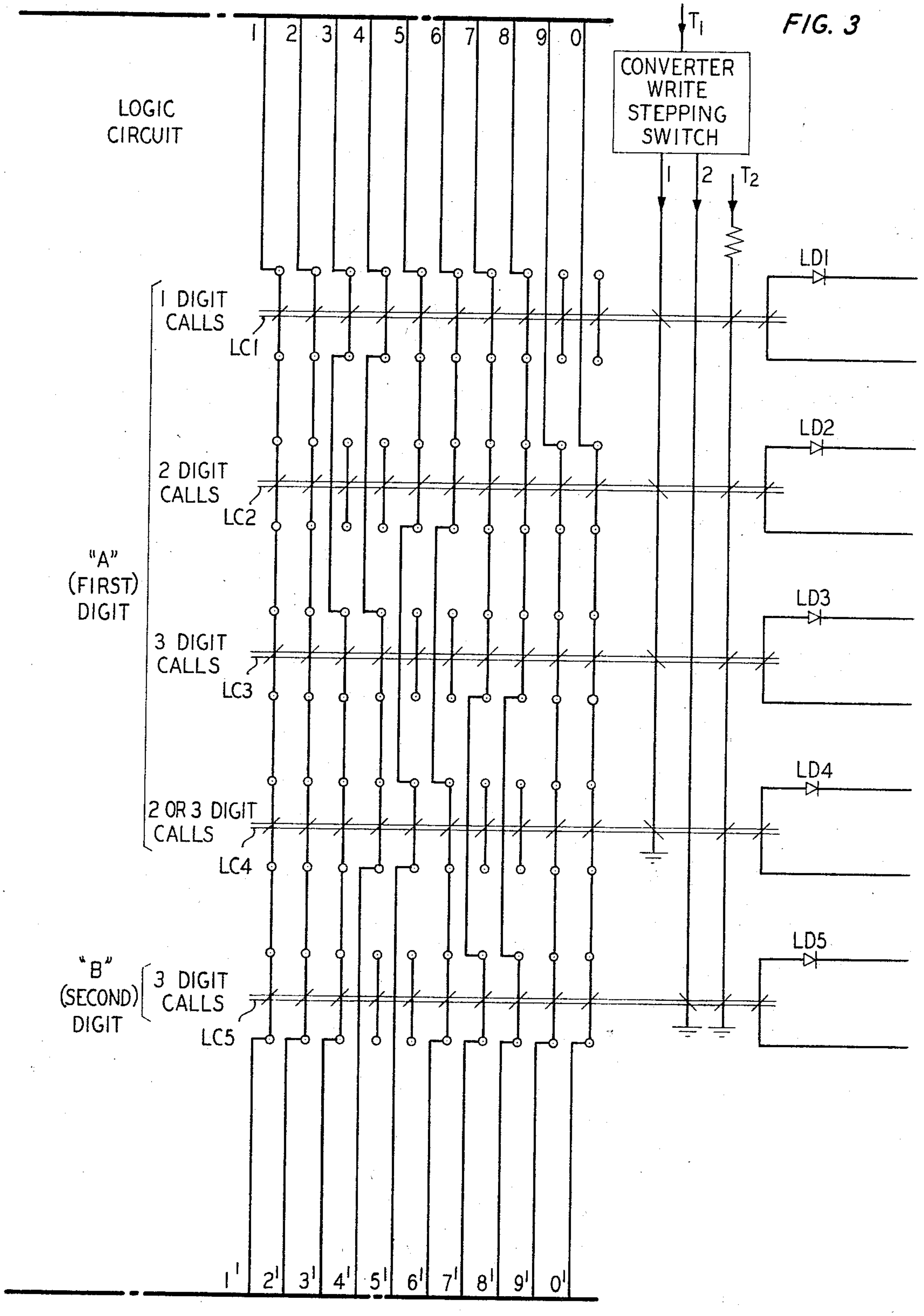
FIG. 3 shows the pretranslator logic circuit, prewired in accordance with a predetermined PBX code.
Figure 4:
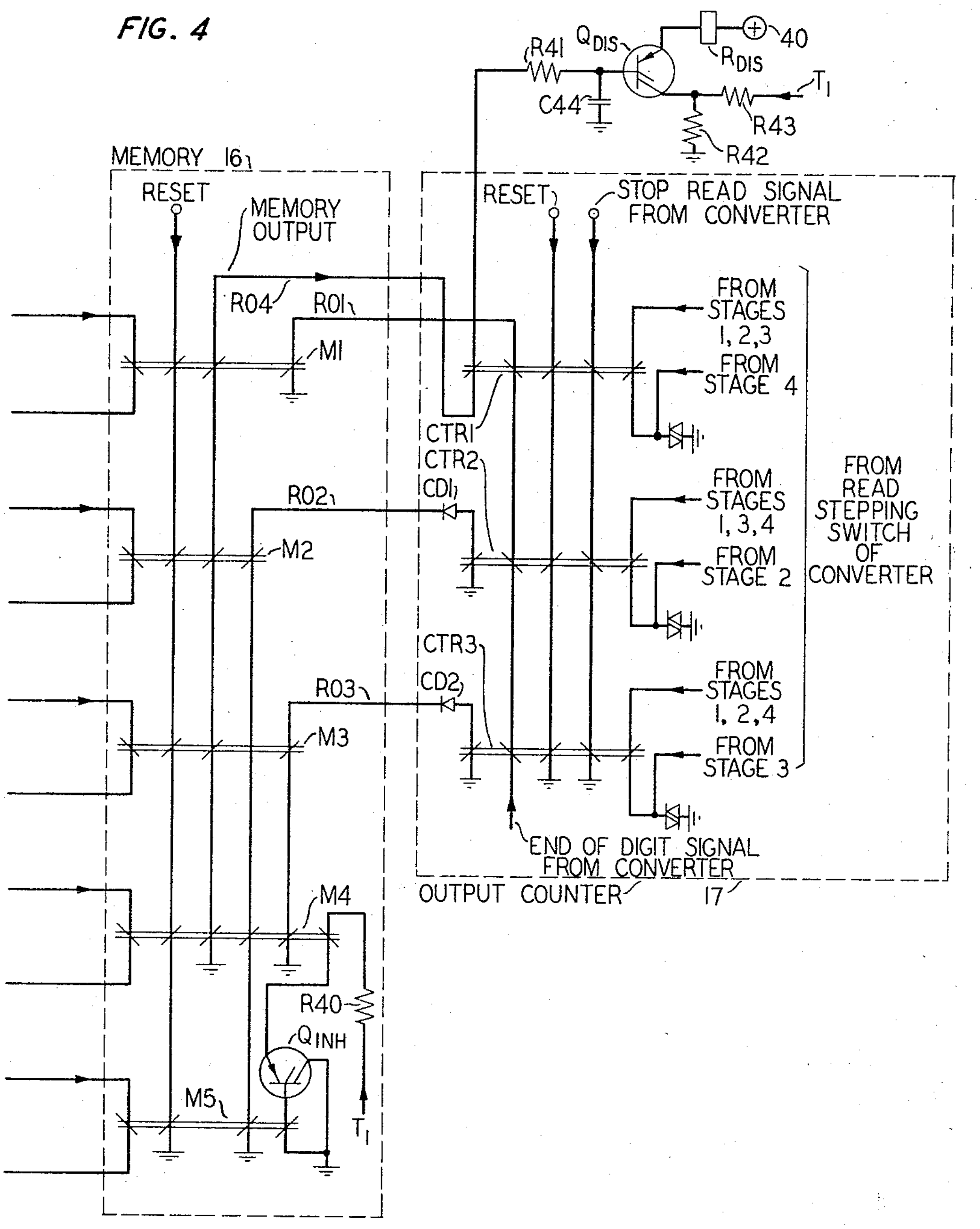
FIG. 4 shows the pretranslator memory, output counter and disconnect circuits.
Figure 5:
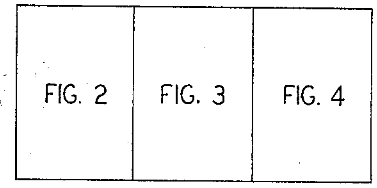
FIG. 5 indicates the manner in which FIGS. 2 through 4 should be placed for a complete understanding of the invention.

*FIGS. 2 through 4*

In the following detailed description, and especially in connection with the logic circuit of FIG. 3 and the memory and output counter circuits of FIG. 4, magnetic core mirror symbols which have become accepted in the art will be relied upon. Such symbols were described in the article "Pulse Switching Circuits Using Magnetic Cores," by M. Karnaugh at page 572 of the May 1955 Proceedings of the I.R.E. (volume 43).

The semiconductor devices labeled Q1 through Q7 on FIG. 2, and $Q_{INH}$ and $Q_{DIS}$ on FIG. 4 are PNPN transistors which may be of the general type disclosed in I. M. Ross Patent 2,877,359, issued Mar. 10, 1959. These devices utilize a control signal at their base electrode to turn them on, and once so energized, a signal, if present, may pass between the other two electrodes. Thus, such PNPN transistors operate in a manner generally similar to controlled rectifiers.

For the purposes of this description, a typical illustrative multifrequency code will be assumed. Such a code is often used for generating other coded signals which are then transmitted through a converter circuit. One multifrequency code is the so-called 3-by-4 TOUCH-TONE code wherein an individual digit is represented by the simultaneous generation of two frequencies out of seven within the voice frequency band. One of these frequencies is selected from a group of four lower frequencies (the "low group"), while the other frequency is selected from a group of three higher frequencies (the "high group"). This type of code is referred to in W. Bischof et al. Patent 3,140,357, issued July 7, 1964, and at pages 437 et seq. of the December 1961 Bell Laboratories Record.

If we assume for the purposes of this description that one of the calling stations $S_1$ through $S_n$ (each of which may represent extensions connected to a PBX) goes off hook and if we further assume that this PBX and its corresponding extensions are equipped for TOUCH-TONE pushbutton calling, such a service request (for example by calling station $S_2$) will activate well-known circuits within the symbolic block labeled "Connecting Equipment" 2 on FIG. 2. When a connection has been established through the connecting equipment 2, one of a plurality of multifrequency receivers such as 3 is then seized. This receiver, of a type well known in the art, may be similar to that disclosed in the above-referred to C. G. Morrison et al. Patent. Since any given digit in the TOUCH-TONE code also priorly referred to is represented by one of four low group voice frequencies coincidentally generated with one of three high group voice frequencies, the multifrequency receiver 3 initially separates the low and high group frequencies and is arranged to provide two separate discrete level output signals, one representing each of the high and low groups. For example, the digit 2 is represented in the TOUCH-TONE code by the simultaneous generation of a low group frequency which may be denoted as L1 and a high group frequency denoted as H2; similarly, the digit 7 is represented by low group L3 coincident with high group H1.

The two-out-of-seven multifrequency receiver output is delivered to one of the leads L1 through L4 and to one of the leads H1 through H3 shown on FIG. 2. The corresponding circuitry to which these signals are delivered shown on FIG. 2 as including PNPN transistors Q1–Q7, diodes D1–D0, diodes D1′–D0′ and accompanying resistors and capacitors may advantageously represent a portion of the converter input drive circuit 4 indicated on FIG. 1. Although this drive circuit 4 also provides input write signals to the converter memory 5 of FIG. 1, those connections are not shown on FIG. 2; the only connections which are shown are those connecting the input drive PNPN transistors Q1–Q7 and the logic circuit cores of FIG. 3.

An additional point to be noted before sample call progressions are described and traced out is that the block labeled "Converter Write Stepping Switch" on FIG, 3 is merely a symbolic representation of the first two stages of the converter write stepping switch 6 shown incorporated into the block diagram on FIG. 1. (Activation of the first stage of the switch 6 causes storage of the first digit of a sequence in the converter memory 5; activation of the second stage causes storage of the second digit, etc.)

*PBX code—prewired into logic circuit of FIG. 3*

The code to be described below may be chosen according to the needs of a particular PBX and the code shown is meant to be only illustrative of the type of code which may be used. However, to facilitate the description to follow, this illustrative code will be assumed to exist in the hypothetical PBX for which the invention is designed. The relationship between the illustrative code and the logic :cuit of FIG. 3 will be described following the recitation the actual code. The code is as follows:

| or first digit: | Type of call indicated |
|---|---|
| 9 or 0 | 1 digit. |
| 3 or 4 | 2 digits. |
| 5 or 6 | 3 digits. |
| 7 or 8 | 2 or 3 digits.[1] |

[1] If the B or second digit is other than a 4 or a 5, a two-git call is indicated; the B digit is a 4 to 5, a three-digit .ll is indicated.

hus, it can be seen from the above code that the digits through 6, 9 and 0 in the A digit position are "conclu-ve" digits in that the number of digits to be expected is ıally determined after the transmission of only one digit. or example, all two-digit calls (e.g., to special tie lines) . this hypothetical PBX may be arranged to have either 3 or a 4 in the first digit position of the call. On the ther hand, the digits 7 or 8 in the first digit position of call are "inconclusive" digits in that no final determina-on of the number of digits to be expected is made until ;ceipt of the second or B digit. For example, the receipt f digits 7 and 3 in sequence by the dialing of 73 indi-ıtes a two-digit call, whereas the receipt of digits 7 and in sequence by dialing 74 indicates a three-digit call. :alls with 9 or 0 in the A position may be utilized for ;izing a central office trunk and for connection to an perator position respectively; in this sense, such calls re of 1 digit duration.

Finally, it is assumed that all internal calls from one BX extension to another are uniformly 4 digit calls be-inning with the digits 1 or 2, and that such calls there-ɔre require no pretranslation and are not "programmed" r prewired into the logic circuit of FIG. 3.

As applied to the logic circuit of FIG. 3 this code is /ired into the various magnetic cores LC1–LC5 thereof y bypassing selected windings on each of these cores. ignals transmitted by the drive PNPN transistors Q1–)7 of FIG. 2 to the logic circuit of FIG. 3 thereby gen-rate flux flow in the cores of FIG. 3 to correspond to he number of digits anticipated in accordance with the 'BX code. For example, the digit 3 in the illustrative ode in the first digit position indicates a two-digit call nd is arranged to set logic circuit core LC2 to the right ɔ so indicate. This is achieved by bypassing the third nput winding on logic circuit core LC2 and thereby al-owing a $T_1$ pulse from the converter write stepping switch tage 1 to set core LC2 to the right.

What actually occurs when a PBX extension customer lepresses his pushbutton to number 3 to commence a call s as follows: The TOUCH-TONE pushbutton code is ırranged to generate, under these circumstances, the L1 ow group voice frequency coincident with the H3 high ;roup voice frequency to represent the digit 3. This nultifrequency siganl is transmitted through the connect-ng equipment 2 of FIG. 2 and is decoded by the multi-:requency receiver 3 to provide discrete output signals on eads L1 and H3 of FIG. 2. PNPN transistors Q1 and Q7 ıre thereby energized and due to the poling of the asso-:iated diodes D1–D3 and D3′, D6′ and D9′ respectively, he only signal which is transmitted from FIG. 2 to FIG. } is the next $T_1$ pulse which is linked to all the input ;lectrodes of PNPN transistors Q1–Q4. Thus, such a $T_1$ ɔulse is transmitted through the only energized PNPN :ransistor Q1 and thence through diodes D1, D2, and D3 ɔver the leads 1, 2, and 3, respectively, which are shown :abled from FIG. 2 to the upper part of FIG. 3. The :ransmitted $T_1$ pulse will find a complete electrical path ɔnly from lead 3 on the top of FIG. 3 through the third windings of all logic circuit cores, except core LC2, to lead 3′ on the bottom of FIG. 3 and the lower right-hand ɔortion of FIG. 2, through diode D3′ and the only one of the high group PNPN transistors which has been ener-gized by the input signal, i.e., Q7, to ground at its output ;lectrode. The electrical paths including leads 1 and 2 leading to 1′ and 2′ through the logic circuit are blocked on FIG. 2 by the off conditions of PNPN transistors of Q5 and Q6, respectively. Therefore, when the $T_1$ pulse proceeds from L3 through the logic circuit it tends to set all logic cores except LC2 to the left, but due to the si-multaneous transmission of a $T_1$ pulse from the first stage of the converter write stepping switch through a winding on cores LC1–LC4, tending to set these same cores to the right, all cores which receive a $T_1$ pulse through both of these windings will not be switched due to this inhib-iting or canceling effect. However, since the third wind-ing of core LC2 is bypassed in accordance with the above code, the only pulse which any winding on core LC2 re-ceives is the $T_1$ pulse through the winding connected to the first stage of the converter write stepping switch tend-ing to set core LC2 to the right. Due to the absence of any inhibiting pulse tending to set that core to the left the core in fact is set to the right, thus indicating a two-digit call.

*Illustrative calls—Example 1—first digit conclusive*

For descriptive purposes, this first example will be one in which the first digit received by the present translat-ing circuit conclusively determines the total number of digits to be received. Let it be assumed that a PBX call-ing station such as $S_2$ desires to make the two-digit call represented by the digits 36. In so doing, station $S_2$ goes off hook and is connected through appropriate switching equipment within connecting equipment block 2 to a multifrequency receiver 3 and its associated converting and pretranslating equipment. The depressing of the push-button 3 by station $S_2$ results as previously described in the setting of logic circuit core LC2 to the right by a $T_1$ pulse. In accordance with the pulse schedule of FIG. 1A, the next control pulse is a $T_2$ pulse which is associated with a winding on all the cores LC1–LC5 of the logic circuit. When such a $T_2$ pulse is transmitted through the common readout windings of these cores, it has the effect of attempting to set all the cores to the left. Of course, any cores which are already set to the left will remain unaffected by this $T_2$ pulse. In our example, the core which will be switched by this $T_2$ pulse is the only core which had priorly been set to the right, namely core LC2. When core LC2 is switched to the left by this $T_2$ pulse, an output signal is developed in the individual output winding of the core and the signal is thereby transmitted through diode LD2 to the linked input wind-ing of memory core M2, setting that core to the right. The relationship between the memory 16 and the output counter 17 of the pretranslator and the read stepping switch 7, the output amplifier 8 and the translating stepping switch 9 of the converter now comes into play.

Describing this relationship with respect to FIG. 4, switching is commenced with memory core M2 set to the right as previously noted. The pretranslator output counter 17 is arranged to sequentially scan the various memory cores or "cells" and to read out at appropriate times any information which may be stored therein to effect a disconnect signal which will disconnect the con-verter 1 from the calling line as indicated on FIG. 1. The connections from the converter read stepping switch 7 to the pretranslator output counter 17 are shown in detail form on FIG. 4. For example, counter core CTR1 receives signals at its right-hand input winding from stages 1, 2, and 3 of the read stepping switch, while any signals from stage 4 are arranged to bypass this winding. For our par-ticular assumed call, the connections to the right-hand input winding of counter core CTR2 should be pointed out. Of the first four stages of the read stepping switch, it may be seen that signals are received by the right-hand input winding of core CTR2 from all these stages except stage 2.

The output amplifiers 8 and all the stages of the read stepping switch 7 of the converter circuit which respec-tively produce the "stop read" and input signals to the counter are synchronously controlled by $T_2$ pulses as shown on FIG. 1. On the first $T_2$ pulse following the one which reads information out from logic core LC2 to set memory core M2 to the right, the pretranslator output counter 17 coincidentally receives a stop read signal tending to set counter cores CTR1–CTR3 to the right and an inhibiting signal from stage 1 of the converter read stepping switch which simultaneously tends to set each of the cores CTR1–CTR3 to the left. Thus, no switching is effected in any of the cores CTR1–CTR3 at this time; these cores thereby remain in their normal state, reset to the left. Shortly thereafter, in response to a $T_1$ pulse, an end-of-digit signal from the translating stepping switch 9 of the converter is transmitted through a winding on each of the cores CTR1–CTR3 tending to set each of those cores to the left. Since the cores CTR1–CTR3 are already set to the left however, no switching results; similarly, the transmission of this end-of-digit signal over readout lead RO1 through the right-hand winding of memory core M1, tending to set that core to the left, is of no effect, since no information had priorly been written into memory core M1 and it too was in its normal left-oriented state.

At this point, then, following the first end-of-digit signal from the translating stepping switch 9 of the converter (indicating that the first digit, i.e., 3, has been outpulsed from the converter to the pulse responsive equipment 11), the output counter has scanned the first core (M1) of the memory and having determined that no information was stored therein, has taken no action. When the next $T_2$ synchronizing pulse activates the read stepping switch (second stage) and output amplifiers of the converter, thereby reading out the second digit of the call to the translating stepping switch 9 and providing the simultaneous inputs to the stop read lead of the output counter and to the right-hand windings of the counter's cores, a significant difference may be noticed. This is based upon the fact that since it is stage 2 of the read stepping switch which is being activated at this time, the right-hand inhibit winding of core CTR2 will not receive a signal therefrom. Thus, although counter cores CTR1 and CTR3 will remain unaffected by simultaneous stop read and stage 2 read stepping switch signals, core CTR2 will switch to the right.

The second end-of-digit signal from the converter proceeds through the associated windings in the output counter in response to the following $T_1$ pulse, indicating that the second digit has been "converted" and is being transmitted to the pulse responsive equipment 11. This end-of-digit signal, in attempting to set all counter cores to the left, will only achieve flux switching of a core that was priorly set to the right and this description is only met by counter core CTR2. When counter core CTR2 does in fact switch to the left, an output signal is induced in the left-hand output winding thereof which is linked by diode CD1 and lead RO2 to selected windings on memory cores M2, M4, and M5. The direction of this linkage is such that the output signal tends to set the linked memory cores to the left. Since only memory core M2 has information stored in it, it is the only core presently set to the right and consequently it will be the only memory core to be switched when scanned by the output signal from counter core CTR2. When memory core M2 is so switched, an output signal is induced in the readout winding common to memory cores M1–M4 and that output signal proceeds over memory output lead RO4 through resistor R41 to the control electrode of PNPN transistor $Q_{DIS}$.

Disconnect transistor $Q_{DIS}$ is thereby turned on and a complete operating path for relay $R_{DIS}$ can now be traced from potential source 40 through the winding of relay $R_{DIS}$ through the active electrode path of PNPN transistor $Q_{DIS}$ and to ground through resistor R42. (Resistors R41–R43 and capacitor C44 combine to provide noise protection and to prevent short duration outputs from memory core M4, to be described below with respect to the next illustrative call, from operating the disconnect circuit; a $T_1$ pulse is supplied to transistor $Q_{DIS}$ through resistor R43 to furnish a bias signal for additional noise protection.) The operation of relay $R_{DIS}$ results, inter alia, in the opening of break contacts DIS–1 and DIS–2 in connecting equipment 2 on FIG. 2, thereby disconnecting calling station $S_2$ from the converter and pretranslating equipment. This may properly be done at this time since the pretranslator has informed the connecting equipment that in accordance with the PBX code, no more digits are expected from calling station $S_2$. The converter and pretranslator may thus be utilized by some other calling station $S_1$–$S_N$ and there is no excess holding time between the previous calling station ($S_2$) and common equipment.

*Illustrative call—Example No. 2—first digit inconclusive*

This example will be directed towards the situation priorly adverted to in which the first digit of the sequence to be transmitted does not conclusively determine, by itself, the total number of digits expected; i.e., it is referred to as an "inconclusive" digit in the first digit position of the sequence. The inclusion of a provision in this system allowing use of such inconclusive digits in the first digit position may often permit greater storage capacity and numerical assignment flexibility due to the alternative nature in the numbers of digits to be expected when the first digit is inconclusive.

Referring back to the illustrative PBX code, it is noted that if the A digit is a 7 or 8, either a two- or three-digit call is indicated; final determination must await the transmission of the second digit which, if it is a 4 or 5, indicates a three-digit call but if not a 4 or 5, indicates a two-digit call. The situation of an inconclusive digit in the A digit position will be broken down for descriptive purposes into two subexamples, one in which the second digit is a 4 or 5 and one in which it is some other digit.

*Example 2A.—Two-digit call with a digit inconclusive*

The criteria for this illustration may be met, for example, by a calling station transmitting the digits 7 and 2 in sequence. Again, it is assumed that calling station $S_2$ initiates a service request and is connected through connecting equipment 2 and multifrequency receiver 3 to a converter and the pretranslating equipment of the instant invention. When such a station depresses TOUCH-TONE pushbutton 7 on the calling instrument, thereby generating simultaneous voice frequencies H1 and L3 according to the TOUCH-TONE pushbutton code, PNPN transistors Q3 and Q5 are thereby turned on at their respective control base electrodes over leads L3 and H1, respectively on FIG. 2. The only available electrical path for the next $T_1$ control pulse may be traced through the active electrodes of PNPN transistor Q3, diode D7, lead 7 coupling FIG. 2 to FIG. 3, the seventh winding of all logic circuit cores except core LC4, lead 7′ coupling the logic circuit back to the drive circuit of FIG. 2, diode D7′ and through the active electrodes of PNPN transistor Q5 to ground. All other paths are blocked. Although the passage of this $T_1$ pulse through the seventh winding of four of the five logic circuit cores attempts to set those cores to the left, a simultaneous $T_1$ pulse is transmitted from stage 1 of the converter write stepping switch through a winding on each of cores LC1–LC4 tending to set those cores to the right. Thus switching is inhibited with respect to cores LC1, LC2 and LC3. Core LC5 not having received a right-oriented $T_1$ pulse from stage 1 of the converter write stepping switch remains in its normal left-oriented switching state, being unaffected by the $T_1$ pulse through its seventh winding. However, the present wiring of the above-mentioned PBX code into the logic circuit cores of FIG. 3 includes a by-passing of the seventh winding of core LC4, and it is therefore switched to the right under the control of ie $T_1$ pulse from stage 1 of the converter write stepping vitch.

According to the pulse schedule of FIG. 1A, the next ulse is a $T_2$ pulse which is transmitted through the comion read out winding on each of cores LC1–LC5. As efore, the only cores which will be switched by such pulse (which tends to set all the cores to the left) is core which had been previously set to the right; in this articular example, only core LC4 meets that descripon. When core LC4 is so switched, an inductive pickup 1 its output winding is transmitted through diode LD4 ) the lefthand input winding of memory core M4 which ; thereby set to the right. As the first inconclusive digit 7) proceeds through the converter 1, and as before when oincident $T_2$ controlled signals are received from stage of the read stepping switch and the stop read lead of he output amplifier 8 of the converter, no counter cores re switched and memory core M1 is scanned by the first nd-of-digit signal. Having had no information written in t, none can be read out from core M1 in response to the irst end-of-digit signal from the translator stepping switch '. However, when stage 2 of the read stepping switch is ctivated coincidentally with the second stop read signal rom the converter, it is seen that counter core CTR2 s no longer inhibited from switching and in fact switches o the right under the influence of the stop read signal.

When the next or second end-of-digit signal is re:eived from the converter, the passage of such a pulse hrough the counter core windings affects only counter :ore CTR2 and switches it to the left thereby generatng an output voltage which is picked up by the left-hand )utput winding of core CTR2 and transmitted to ground hrough diode CD1, over readout lead RO2, and through vindings on memory cores M2, M4 and M5. The only nemory core which is affected by this output pickup pulse s memory core M4 which is the only one priorly set to :he right as previously indicated. In switching, an output signal is developed in memory core M4's output winding which is transmitted upward through the memory and over readout lead RO4 and resistor R41 to turn on disconnect PNPN transistor $Q_{DIS}$. Disconnect contacts DIS–1 and DIS–2 are shortly thereafter operated in response to the energization of relay $R_{DIS}$ and in so operating, disconnect calling station $S_2$ from the common equipment immediately following the transmission of the second digit through the converter.

*Example 2B.—Three-digit call with a digit inconclusive*

One example of this type of call is the sequential dialing of the digits 74X, where X may represent any digit. According to the PBX code as noted above, the digit 7 is inconclusive and indicates either a two- or three-digit call; the arrival of the B digit 4 then indicates a three-digit call. The circuit must therefore be arranged to allow the disconnect signal to occur only after the third end-of-digit signal from the converter 1 to the output counter 17, even though there is circuitry for achieving this same disconnect signal after the second end-of digit signal. (For instance, see Example 2A in which the disconnect occurred after the second digit and where the first digit was the same inconclusive 7 as with the instant example.)

The depression of pushbutton 7 by calling station $S_2$ transmits signals over leads H1 and L3 and following the exact same pattern as in Example 2A, sets memory core M4 to the right in response to a $T_2$ pulse. Also identical to the previous example, no readout occurs after the first end-of-digit signal. It is only at this point that the pretranslator is affected by the second depression of calling station $S_2$'s pushbuttons, which in this assumed example is the pushbutton 4. This generates coincident frequencies H1 and L2 and over leads H1 and L2 energizes PNPN transistors Q2 and Q5 in the drive circuitry of FIG. 2. The path for the next $T_1$ pulse, which is now coincident with signals from the second stage of the converter write stepping switch, is through diode D4, lead 4, and the fourth windings of core LC1, LC3, and LC4, lead 4', diode D4' and to ground through the active electrodes of PNPN transistor Q5. Since cores LC1, LC3, and LC4, are normally switched to the left, they are unaffected by this $T_1$ pulse tending to switch them in that same direction; similarly, although the fourth winding on core LC2 is bypassed by this $T_1$ pulse, it also receives no $T_1$ pulse from the converter write stepping switch, since that pulse is only coupled from the first stage of that switch to core LC2. The only logic circuit core which does receive a $T_1$ pulse from the converter write stepping switch and which does not receive a coincident inhibiting $T_1$ pulse from the drive circuit is core LC5 which therefore switches to the right.

When the next $T_2$ pulse arrives shortly thereafter, the only core which will be affected is core LC5 which, in being reset, delivers an output signal through diode LD5 to set memory core M5 to the right. Thus, prior to any scanning other than of normally reset memory core M1 by the first end-of-digit signal, information is stored in both memory cores M4 and M5 by their being set to the right. Now, when the second stop read signal from the converter switches counter core CTR2 to the right (coincident with the $T_2$ pulse which reads out core LC5) and the second end-of-digit signal (coincident with the next $T_1$ pulse) reads out from the counter core CTR2 by switching it to the left, an output pulse is again generated from the left-hand readout winding of core CTR2 which is transmitted through diode CD1 and over readout lead RO2 to windings on memory cores M2, M4, and M5. Memory core M2 remains unaffected since it is in the normal left-oriented (reset) switching state. But the output pulse attempts to reset memory cores M4 and M5 to the left. Both of these cores begin to switch but they are inhibited from finally switching by the inhibiting circuit linking cores M4 and M5, and comprising a $T_1$ control pulse delivered through resistor R40 to inhibiting PNPN transistor $Q_{INH}$. This circuit operates as follows: Since the output scanning signal from counter core CTR2 to the responsive windings of memory cores M4 and M5 is under the control of the second end-of-digit signal from the converter which in turn is synchronously controlled by a $T_1$ timing pulse, inhibiting action is possible. As core M5 begins to switch to the left, an output voltage is developed across the right-hand output winding of memory core M5 connected to the control electrode of PNPN transistor $Q_{INH}$. This voltage allows $Q_{INH}$ to turn on and in so doing provides an electrical path for a $T_1$ pulse through resistor R40, through the right-hand inhibiting winding of memory core M4 and to ground through the active electrodes of tansistor $Q_{INH}$. The switching of memory core M4 is thus immediately inhibited and information remains stored therein; i.e., memory core M4 remains switched to the right. (Abortive outputs from core M4 do not affect the disconnect circuit by virtue of protective elements R41–R43, C44 and the $T_1$ bias through resistor R43.) Memory core M5 is now switched to the left and will not participate in further switching or inhibiting in this sequence. Inhibiting PNPN transistor $Q_{INH}$ turns off when the $T_1$ inhibiting pulse terminates. Further inhibiting $T_1$ pulses are thereby blocked from affecting memory core M4.

When the third digit has proceeded through the converter and coincident signals under the control of a $T_2$ pulse are transmitted from the third stage of the converter read stepping switch and from the stop read lead, output counter core CTR3 is set to the right under the influence of this stop read signal. The next or third end-of-digit signal from the translating stepping switch 9 of the converter switches counter core CTR3 to the left thereby generating an induced output pulse in the left-hand output winding of counter core CTR3; this pulse is transmitted through diode CD2 and over lead RO3 through windings on memory cores M3 and M4. However, only memory core M4 of these two has any information stored therein and being the only core set to the right, it will be the only core switched by this output pulse which tends to set cores M3 and M4 to the left. Accordingly, memory core M4 does so switch and develops an output pulse across its output winding which is linked over memory output lead RO4 and resistor R41 to turn on disconnect PNPN transistor $Q_{DIS}$ and allow for the operation of disconnecting relay $R_{DIS}$. The operation of relay $R_{DIS}$ at its break contacts DIS–1 and DIS–2 disconnects calling station $S_2$ from the common equipment after the third digit has been transmitted, converted and pretranslated.

Since the hypothetical PBX to which this invention has been illustratively applied is assumed to accept only up to four-digit calls, there is no real need for pretranslation of four-digit calls and provision of circuitry to do this would only entail additional needless expense. Therefore, the invention is arranged to automatically disconnect calling stations from common converters and pretranslators after the fourth digit if such a call is indicated. When a four-digit call is commenced, indicated by a 1 or a 2 in the A digit position, no logic circuit or memory cores are switched. Thus, as the output counter scans the memory cores, no output will initially be developed to operate the disconnect circuit. However, when the fourth stage of the converter read stepping switch is activated coincidentally with the fourth stop read signal from the converter, it may be seen that the counter core CTR1 will be set to the right. When the next or fourth end-of-digit signal is transmitted to the output counter from the converter, counter core CTR1 will be switched back to the left, thereby developing an output pulse over its left-hand output winding which is directly coupled through resistor R41 to turn on disconnect PNPN transistor $Q_{DIS}$, and the disconnect circuit operates as before. It is noted that no interaction between counter core CTR1 and the memory cores M1–M5 occurs when there is a four-digit call; i.e., there is in effect no pretranslation.

As a final note, the various windings on all cores of this circuit labeled "reset" may advantageously be connected to a common pulsing source which provides reset pulses to all of the cores of the logic, memory, and output counter circuits to reset all these cores to the left, which is their normal switching state. The resetting function is achieved on logic circuit cores LC1–LC5 of FIG. 3 through the use of the common readout winding linked to phase $T_2$ of the control pulse schedule.

It is to be understood that the above-described arrangements are illustrative of the application of the principles of the invention. Numerous other arrangements may be devised by those skilled in the art without departing from the spirit and scope of the invention.

What is claimed is:

1. In a telephone system having a plurality of stations for transmitting sequences of first type coded signals having digital significance and converter means for receiving said signals and for translating said signals into predetermined sequences of second type coded signals, a pretranslator connectable with said stations comprising memory means, logic means responsive to at least one of said first type coded signals for selectively storing said one first type coded signal in said memory means, means for counting the number of said second type coded signals, means controlled by said counting means for selectively interrogating said memory means, and output means coupled to said memory means and responsive to said interrogating means for disconnecting said converter circuit from said one of said stations.

2. In a telephone system according to claim 1, a pretranslator wherein said selectively storing logic means comprises a plurality of magnetic cores, means for storing a digit of said first type coded signals in one of said cores to indicate a predetermined number of digits in one of said sequences of said first type signals and mear for storing digits of said one first type signal sequenc in more than one of said plurality of cores to indicat a different predetermined number of digits in said or first type coded signal sequence.

3. In a telephone system according to claim 2, a pr translator wherein said selectively interrogating mear includes means for detecting the inception of switching i one of said plurality of cores and for inhibiting th switching of another of said plurality of cores.

4. In a telephone system according to claim 3, a pre translator wherein said one and said another of said core are simultaneously interrogated and wherein said mean for inhibiting includes a PNPN transistor coupled to sai one of said cores for applying an inhibiting signal to sai another of said cores prior to the completion of sai switching of said another of said cores.

5. A digit sequence translator comprising means fo registering the digits of said sequence one at a time, plurality of detecting means each for detecting the occur rence of one of a first group of predetermined digits i one of a plurality of digit positions of said sequence means responsive to any of said detecting means detectin one of said first group of predetermined digits for signal ing the completion of said sequence, supplementary de tecting means for at least one of said digit positions fo detecting the occurrence therein of one of a second grou of predetermined digits, means responsive to said supple mentary detecting means detecting one of said secon group of predetermined digits for initiating readout of signal indicative of the completion of said sequence means responsive to the initiation of said readout fo temporarily inhibiting said signal, and means responsive to said detecting means detecting an additional digit o said sequence for completing said readout.

6. A pretranslator connectable to a source of digital information comprising means for registering digits one at a time, a plurality of indicating means each energizable to indicate a respective number of digits to be successively registered in said registering means, at least one indicating means energizable to indicate alternative numbers of said digits to be successively registered in said registering means, decoding means responsive to the registration of a first digit in said registering means for selectively energizing one of said plurality of indicating means or said one indicating means, means responsive to the energization of one of said plurality of indicating means for releasing said registering means from said source after said respective number of said digits have been successively registered therein, and means responsive to the energization of said one indicating means for releasing said registering means from said source after the selected ones of said alternative numbers of digits have been successively registered therein.

7. A digit sequence translator comprising means for counting the number of digits transmitted in said sequence, first means for detecting any of a plurality of first predetermined digits in a first digit position of said sequence, second means for detecting any of a plurality of second predetermined digits in a second digit position of said sequence, first storage means controlled by said first detecting means for storing an indication of the occurrence of one of said first predetermined digits in said first digit position, second storage means for storing an indication of the occurrence of one of said second digits in said second digit position, means responsive to the reception of the second digit of said sequence for initiating the readout of said indications stored in said first and said second storage means, means responsive to the initiation of said second storage means for inhibiting the completion of the readout initiated at said first storage means by said second digit of said sequence, and means responsive to the receipt of the third digit of said sequence for completing the readout of said first storage means.

8. Apparatus for determining the completion of vari-le length digit sequences comprising first means for gistering the occurrence of a predetermined digit during first interval, means for interrogating said first means ıring two subsequent intervals, second means for regis-ring the occurrence of a predetermined digit after the 'st of said subsequent intervals, means for interrogating id second means during the second of said subsequent tervals, means responsive to the interrogation of said cond means having registered said predetermined digit ır suppressing the interrogation of said first means dur-g the second of said two subsequent intervals, and eans responsive to the interrogation of any of said gistering means having registered one of said predeter-ined digits for indicating the completion of said digit quence concurrently with the first of any interval after iid two subsequent intervals.

9. Apparatus for determining the completion of vari-ɔle length digit sequences comprising a plurality of etecting means each for detecting the occurrence of one f a group of predetermined digits in each of a corre-ponding plurality of digit positions of said sequence, ıeans for interrogating selected ones of said detecting ıeans one at a time during a respective digit interval of aid sequence, means responsive to the interrogation of ny of said detecting means having detected one of said redetermined digits for indicating the completion of said igit sequence, means for simultaneously initiating the ıterrogation of at least two of said detecting means dur-ıg one predetermined digit interval, means responsive to ıe initiation of said interrogation of said two detecting ıeans when said two detecting means have each detected predetermined one of said digits for suppressing the nterrogation of one of said two detecting means, and neans for interrogating said one of said two detecting neans during a subsequent digit interval.

10. A telephone system comprising a plurality of sta-ion means for transmitting sequences of multifrequency ignals having digital significance, a multifrequency-to-lial pulse converter circuit, means responsive to a service equest for connecting said converter to one of said sta-ion means, means for translating said multifrequency ignals into predetermined sequences of coded signals, onverter memory means, means for storing said coded ignals representing each digit of said sequences in said onverter memory means one at a time, logic means selec-ively responsive to the first of said coded signals having been stored in said converter memory means for indicat-ing the number of remaining digits to be transmitted in the particular sequence, pretranslator memory means for storing said number indicated by said logic means, means for counting the number of digits subsequently transmitted and means responsive to selected scannings of said pre-translator memory means by said counting means for dis-connecting said converter from said one of said station means.

11. In a telephone system a plurality of private branch exchange stations, a converter circuit connectable to said stations in response to a calling request from one of said stations for translating multifrequency signals generated thereby into dial pulses, and pretranslating means for determining the number of digits to be expected from said calling request comprising logic means responsive to each of said multifrequency signals for producing signals in-dicative of said number of digits, memory means for storing said signals from said logic means and output means responsive to an end-of-digit signal from said con-verter circuit for reading out said stored signals to dis-connect said converter circuit from said one of said stations.

12. In a telephone system, a plurality of calling line means for generating a plurality of sets of information in a first signaling mode, converter means connectable to selected ones of said line means for converting said first signaling mode sets to a second signaling mode, and trans-lating means coupled to said converter means comprising logic means responsive to a first of said first mode sets for determining in accordance with a predetermined code the number of said first mode sets to be generated by said calling line means, memory means for storing data steered thereto from said logic means, means including said logic means for detecting a second of said first mode sets, output means responsive to the termination from said converter means of each of said information sets in said second signaling mode for reading out said data from said memory means when said predetermined code in-dicates one of said information sets is the final one to be generated by said calling line means, and switching means for disconnecting said converter means from said calling line means in response to said readout from said memory means.

13. In a telephone system, a source of multifrequency signals representative of a plurality of digits, converter means for converting said multifrequency signals into a series of corresponding dial pulses including means for furnishing an end-of-digit pulse after each of said digits; and pretranslating means coupled to said converter means comprising logic means for steering signals representative of said multifrequency signals in accordance with a pre-determined code, memory means including a plurality of memory cells for storing said steered signals indicative of the anticipated total number of said digits in accord-ance with said predetermined code in at least one of said cells, output counting means responsive to each said end-of-digit pulse for sequentially scanning a different one of said memory cells and for producing a readout signal only if said scanned one of said cells has stored therein a bit indicating the termination of said plurality of digits, and means responsive to said readout signal for discon-necting said converter means from said source.

14. In a telephone system a source of multifrequency signals representative of a plurality of digits, converter means for converting said multifrequency signals into a series of corresponding dial pulses including means for furnishing an end-of-digit pulse after each of said digits, pretranslating means coupled to said converter means comprising logic means for steering signals representative of said multifrequency signals in accordance with a pre-determined code indicative of the total number of said digits, memory means including a plurality of memory cells each individually responsive for storing selected ones of said steered signals indicative of said total number of said digits in accordance with said predetermined code, output counting means responsive to successive ones of said end-of-digit pulses for scanning at least one of said memory cells, said output counting means furnishing a readout signal in response to the presence in said scanned memory cell of one of said steered signals indicating that said end-of-digit pulse follows the final one of said plu-rality of digits, and means responsive to said readout sig-nal for disconnecting said converter means from said source.

No references cited.

KATHLEEN H. CLAFFY, *Primary Examiner.*

W. COOPER, *Assistant Examiner.*